Nov. 2, 1965   H. G. BRILMYER ETAL   3,215,024
FASTENER
Filed Oct. 8, 1964   3 Sheets-Sheet 3
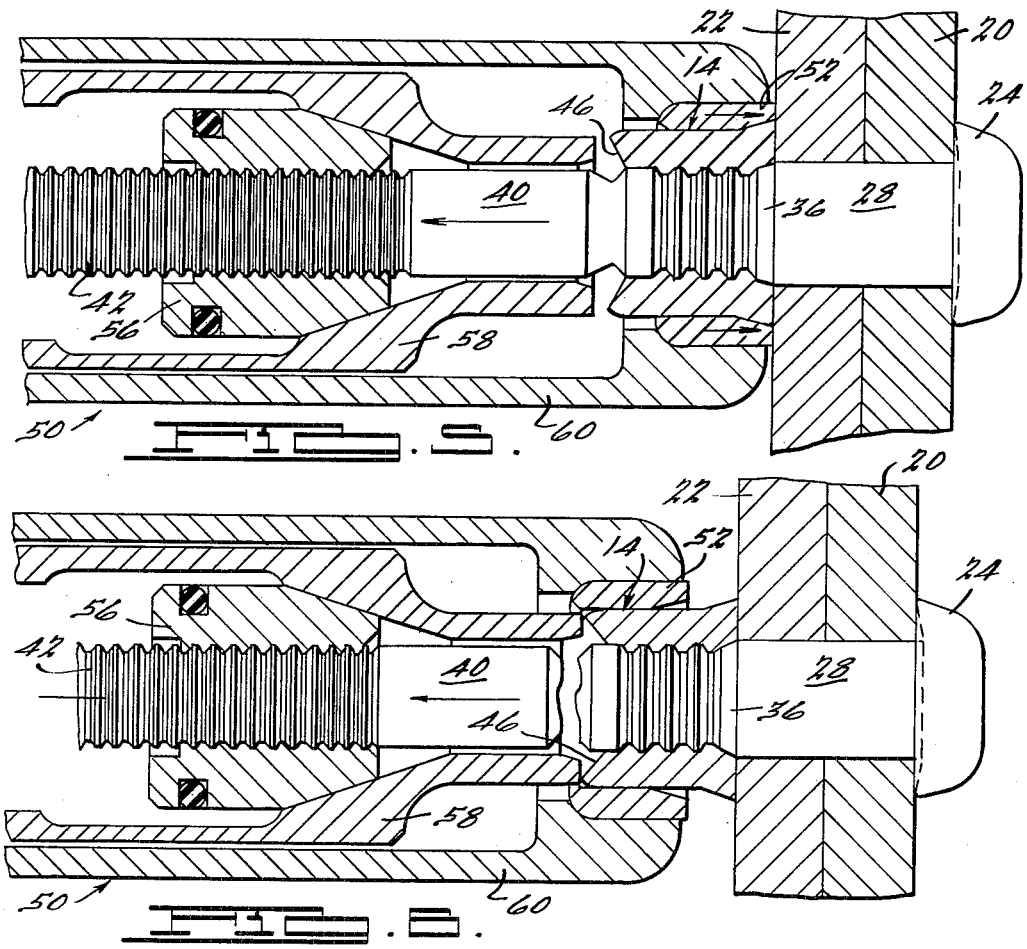
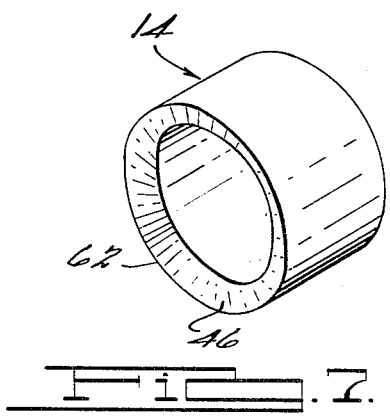
INVENTORS.
Harold G. Brilmyer.
David J. Toth.
BY
Harness, Dickey & Pierce.
ATTORNEYS 3,215,024
FASTENER
Harold G. Brilmyer, Grosse Pointe, and David J. Toth, Dearborn, Mich., assignors to Huck Manufacturing Company, Detroit, Mich., a corporation of Michigan
Filed Oct. 8, 1964, Ser. No. 405,882
4 Claims. (Cl. 85—7)

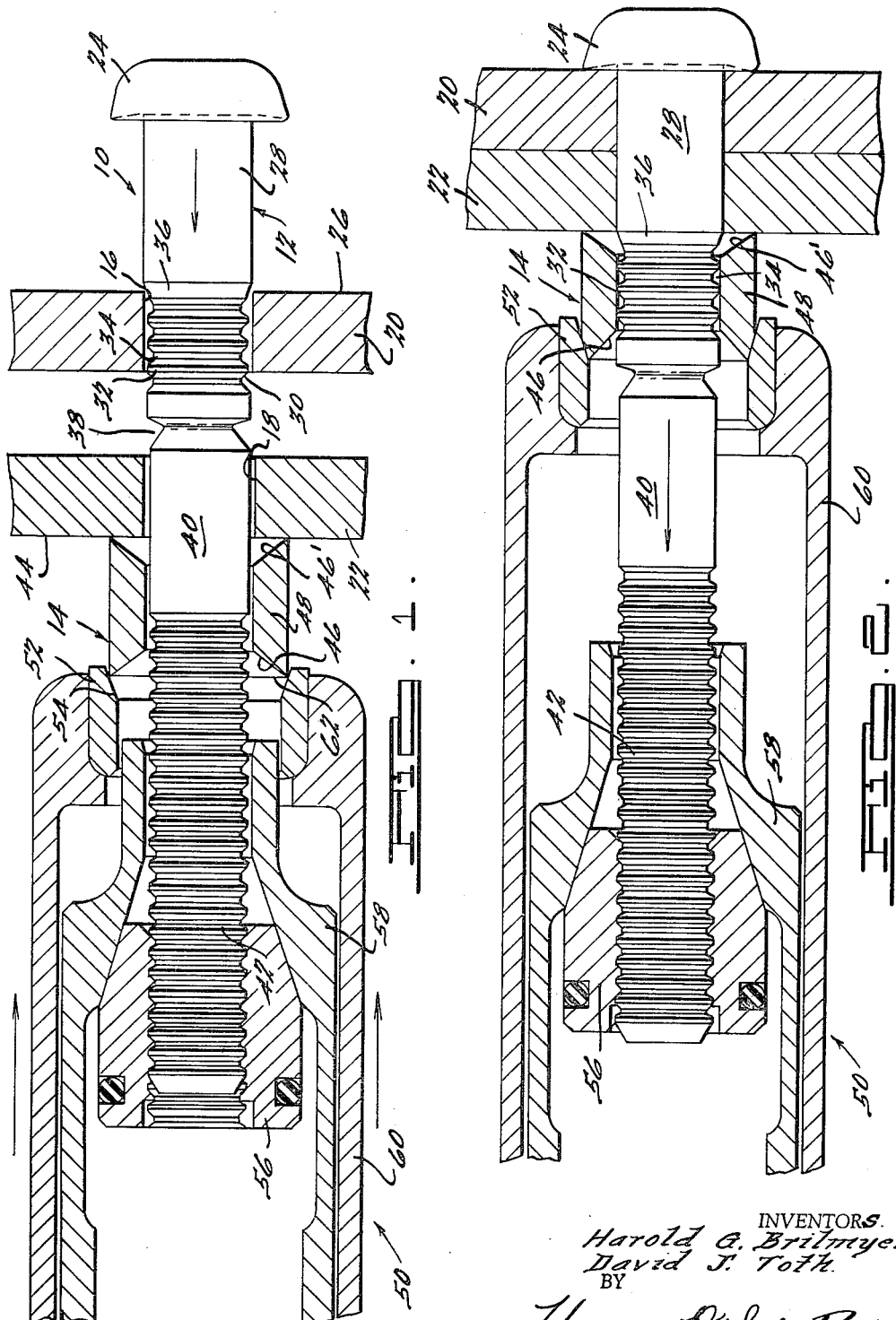

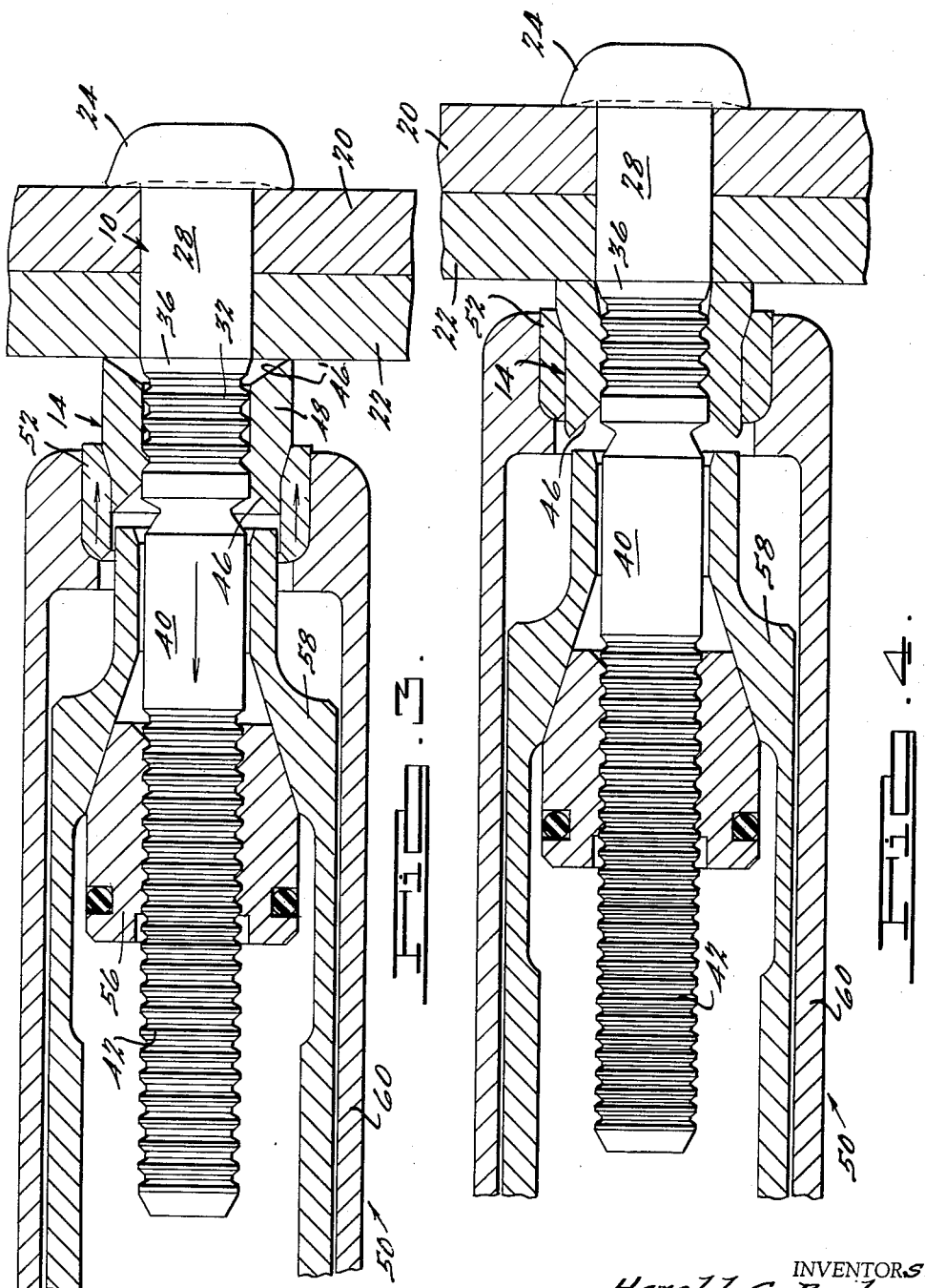

This application is a continuation-in-part of our co-pending applications, Serial No. 671,285, filed July 11, 1965, and Serial No. 333,782, filed November 26, 1963 and now abandoned.

The two-part fastener of this invention includes a pin or bolt having a preformed head adapted to be inserted from one side of the work and a collar adapted to be inserted over the pin at the opposite side of the work for subsequent swaging or clinching to the pin. The work usually consists of two or more plate or panel members having substantially aligned openings through which the pin extends. The pin head engages the outside surface of one of the plate members and the collar engages the outside surface of the other plate member.

The fastener is set by pulling the pin and apply the reaction force to the collar, in substantially the same manner as disclosed in the Huck patents listed above. After a certain pulling force is reached, the collar is locked to the pin by flowing the collar metal into the locking grooves in the pin. However, before a pull of this extent is exerted and thus before any locking of the collar to the pin, the plates are pulled tightly together. In addition, in those instances in which the plate openings provide for an interference fit of the pin in the openings, the initial pin pull also accomplishes sufficient movement of the pin into the openings to provide for automatic "hole-fill." In other words, before the collar has been swaged sufficiently to bring the inside diameter of the collar into engagement with the locking lands which define the locking grooves of the pin, the plates are pulled tightly together and the openings in the plates are filled by the pin. The final clinching operation provides for a complete swaging of the collar into engagement with the locking lands on the pin.

An object of this invention is to provide a fastener of the above type which has a collar of symmetrical shape so that in placing the collar on the pin, the operator does not have to distinguish between the ends, but may apply the collar "either end on."

A further object of this invention is to provide an improved fastener of the above type which has a collar shaped so that the collar can be efficiently and economically produced in quantity.

Still another object of this invention is to provide a fastener of the above type which is simple in construction, economical to manufacture, and which may be quickly applied.

Further objects, features and advantages of this invention will become apparent from a consideration of the following description, the appended claims and the accompanying drawings in which:

FIGURE 1 is a cross-sectional view of the fastener of this invention, shown in assembly relation with a pair of plates to be connected and a fragmentary end portion of a pull gun;

FIGURES 2, 3 and 4 are sectional views illustrated similarly to FIGURE 1 showing the fastener of this invention in successive intermediate stages of setting;

FIGURE 5 is a view similar to FIGURE 1 illustrating the fastener of this invention at the completion of the setting operation but before the final breaking of the pin;

FIGURE 6 is a sectional view like FIGURE 5 showing the fastener of this invention broken at the breakneck and with the pull gun backed off from the position shown in FIGURE 5; and FIGURE 7 is a perspective view of the collar in the fastener of this invention.

With reference to the drawing, the fastener of this invention, indicated generally at 10, is illustrated in FIGURE 1 as including a pin or bolt 12 provided with a collar 14. The pin 12 is illustrated in FIGURE 1 extending through a pair of aligned openings 16 and 18 formed in a pair of plates or panels 20 and 22, respectively, which are to be connected with the fastener 10.

The pin 12 is provided with an integral preformed head 24 adapted to engage the adjacent face 26 of the panel 20 with the pin extending through and beyound the openings 16 and 18. The pin 12 has a cylindrical hole-filling portion 28 adjacent the head 24 and a grooved portion 30 adjacent the portion 28. The portion 30 is illustrated as having three annular ribs or lands 32 with grooves 34 between adjacent ribs 32. However, it is to be understood that more or less ribs 32 may be provided depending on the specific use for which the fastener 10 is intended, as will more clearly appear hereinafter. The outer diameter of the ribs 32 is slightly less than the outer diameter of the hole-filling portion 28. Between the ribs 32 and the portion 28, the shank has a conical taper or shoulder 36.

It is desirable, but not necessary in all applications of the fastener 10, that the plate openings, like the openings 16 and 18, be slightly smaller than the diameter of the cylindrical hole-filling portion 28, but the openings 16 and 18 should in any event be slightly larger than the ribs 32 so that the pin 12 can be easily inserted. When initially inserted, the pin is in the position shown in FIGURE 1.

The pin has a breakneck 38 of reduced diameter formed adjacent the end of the grooved portion 30, and this breakneck 38 represents the weakest part of the pin 12 so that the pin will break under tension at this point before it will break under tension at any other point. The pin has a cylindrical portion 40 next to the breakneck 38 which is of a slightly smaller diameter than the ribs 32 as shown in FIGURE 1. The cylindrical portion 40 terminates at its outer end in a grooved or gripping portion 42 which is elongated relative to other portions of the pin 12.

The second part of the fastener 12 consists of the collar 14 which is received over the end of the pin 12 and is located against the adjacent face 44 of the plate 22, as illustrated in FIGURE 1. The collar 14 is adapted to be swaged or contracted radially inwardly into the grooves 34 on the pin portion 30 so as to lock the collar 14 to the pin 12 and form what constitutes a fastener head positioned against the plate 22 in the set position of the fastener 10.

The collar 14 is illustrated in FIGURE 1 in its initial form, namely, the form of the collar before it is swaged or locked to the pin 12. The collar is generally tubular in shape having a uniform outer diameter, and provided with a pair of tapered identical opposite end portions 46 and 46' and an intermediate portion 48. As shown in FIGURE 1, the intermediate portion 48 has a uniform inner diameter which is slightly larger than the portions 40 and 42 of the pin 12 and with predetermined clearance between the inner surface of the collar and the lands 32 of the locking grooves so that the collar is readily assembled on the pin for movement to the position illustrated in FIGURE 1. By virtue of the fact that the end portions 46 and 46' of the collar 14 are identical, the collar may either be placed on the pin 12 as illustrated in FIGURE 1 or turned around so that the opposite end of the collar is against the plate 22 since, in either event, the collar shape is the same.

The fastener 10 is set by means of a riveting mechanism or gun, of the type shown in Huck U.S. Patents 2,531,048 and 2,531,049, and the nose attachment portion of which is indicated generally at 50 in FIGURE 1 for purposes of illustration. The mechanism 50 includes an anvil 52 having a frusto-conical mouth portion 54 engageable with the adjacent end of the collar 14. The usual gripping jaws 56 are provided on the gun portion 50 for contraction, in response to operation of a body contracting and moving sleeve element 58, into gripping engagement with the pin portion 42. When the jaws 56 and the element 58 moves to the left, as viewed in FIGURES 1–6, so as to pull the pin, the reaction to this pull is applied through a barrel or sleeve 60, which surrounds the jaws 56 and the element 58, to the anvil 52.

After the pin 12 has been inserted through the aligned openings in the plates 20 and 22, as shown in FIGURE 1 the collar 14 is placed over the pin and the riveting mechanism is applied over the pin until the grooved end portion 42 of the pin 12 is gripped by the jaws 56. Initial operation of the pulling mechanism causes the pin to be pulled and the flared mouth portion 54 of the anvil 52 is moved into contact with the adjacent terminal end 62 of the collar 14 so as to press the collar 14 against the plate 22.

With the collar 14 against the plate 22 and the jaws gripping the pin 12, further pull on the pin 12 causes the enlarged hole-filling portion 28 of the pin 12 to draw down to a smaller diameter, or expand the openings 16 and 18, or a combination of both as the pin 12 is moved into and through the openings 16 and 18. Such movement of the pin 12 continues until the head 24 is moved against the adjacent face 26 of the plate 20 as illustrated in FIGURE 2. Under certain conditions, it is desirable that the enlarged hole-filling portion 28 of the pin 12 have an interference fit in the openings 16 and 18, as shown in FIGURES 1 and 2, but under other conditions an interference fit may not be necessary or desirable. During the foregoing procedure, the plates 20 and 22, which are initially spaced as shown in FIGURE 1, are also pulled tightly together, as shown in FIGURE 2. In the FIGURE 2 position of the collar 14, it has been moved to a position surrounding the grooved portion 30 of the pin 12.

When the riveting mechanism is actuated to pull the pin 12 and apply the reaction force to the collar 14, the flared mouth 54 of the anvil 52 tends to move over the adjacent end portion 46 of the collar 14. As illustrated in FIGURES 1 and 7, this end portion 46 is annular in configuration and of a progressively increasing diameter toward the terminal end 62 thereof such that at the end 62, the end portion 46 initially has substantially no thickness. The extent of initial movement of the anvil 52 over the collar 14 depends upon the extent of the resistance to swaging of the collar 14. In any event, whatever swaging does take place does not decrease the inner diameter of the collar 14 to an extent necessary to engage the collar with the pin 12 and thereby cause a premature clinch on the pin, which is a malfunction. In other words, by virtue of the chamfer or outwardly decreasing thickness of the collar end portion 46, any swaging of the collar, such as illustrated in FIGURE 2, has no tendency to decrease the inner diameter of the collar but merely collapses or moves the chamfered collar end portion 46 inwardly. It is by virtue of this collar shape that the collar automatically develops the necessary "hold-off" for preventing premature clinching of the collar onto the pin, or holding off initial clinch until the plates 20 and 22 have been drawn tightly together and the desired movement of the pin portion 28 into a hole-filling position has been completed.

The pull on the pin 12 is continued so that the reaction force of the anvil 52 on the collar 14 is increased and the anvil is progressively moved over the collar 14 as illustrated in FIGURE 3. In the position of the collar shown in FIGURE 3, the collar 14 has been swaged into initial contact with the pin at the outermost locking groove 34. As a result, the initial clinching operation has been completed so that any further free movement between the collar 14 and the pin 12 is prevented.

After the primary clinch has been completed, as illustrated in FIGURE 3, the anvil 52 continues to move over the collar 14 for progressively swaging the collar inwardly into locking engagement with the pin at the grooves 34 as shown in FIGURE 4. Completion of the swaging is illustrated in FIGURE 5 which shows a properly swaged collar, wherein the collar material is illustrated as having been moved into full engagement with all of the ribs 32. As shown in FIGURE 5, the collar is swaged throughout its length.

It is to be noted that what is commonly referred to as the base angle, namely, the angle between the inclined end surface of the collar 14 and the adjacent plate surface 44, which angle results from the tapered shape of the collar end portion 46', has disappeared when the collar has been nearly fully swaged as illustrated in FIGURE 4. After initial clinch has taken place, as previously pointed out, there can be not further relative movement between the pin and collar. As swaging continues the collar elongates which applies a desirable elongation of the pin, provided such elongation does not stress the pin to such an extent as to cause it to break in one of the locking grooves. Any such excessive stress is relieved by the tapered portion 46' and the pin will still retain the desirable pretensile load characteristics to give it high fatigue life. The advantages in providing a collar of a different overall configuration with a base angle are fully discussed in Huck U.S. Patent No. 2,531,049.

When the collar 14 has been fully swaged as illustrated in FIGURE 5, continued pull on the pin 12 provides for fracture of the pin at the groove 38 as shown in FIGURE 6. In the fully set position of the fastener 10 illustrated in FIGURE 6, the collar 14 has been fully swaged onto the pin 12 and the plate openings 16 and 18 have been completely filled by the pin portion 28 so that a tight connection is provided by the fastener 10.

From the above description, it is seen that this invention provided a fastener 10 consisting of a pin 12 and a collar 14 assembled in a predetermined relation with the pin 12. By virtue of the specific shape of the collar 14 so that the collar is symmetrical with respect to a first axis extended axially of the collar, and a second axis extended diametrically of the collar at a position midway between the ends thereof, the collar has identical ends so that it does not have to be examined before it is placed on the pin 12. However, it has the advantage of being a collar which will automatically provide its own "holdoff" characteristics as well as relief against excessive tension loads on the pin during swaging In other words, it does not have a front end and a rear end as is customary in collars of this type, as illustrated in the previously mentioned Huck U.S. Patents Nos. 2,531,048 and 2,531,049. One further advantage of the collar 14 is that it is easy to manufacture and reduces the scrap inherent in the manufacture of collars of this type to an absolute minimum. It is also apparent that while the collar 14 is readily adapted to being formed by the usual cold heading process, it is also readily manufactured by a screw machine process.

The collar of the present invention also has the advantages outlined when applied to a pin known as a stump, i.e., a pin formed without the pull grooves and the breakneck.

While no critical limits have been placed on the chamfers as to their angle or axial length, no such limitations can reasonably be considered necessary. By the very nature of the invention, a very wide range of chamfer angles could be used with specific values or dimensions being readily ascertainable by those skilled in the art in view of the present disclosure. While any chamfer has some beneficial effect in helping holdoff; it is recognized that a minute chamfer, as a conventional deburring chamfer or chamfer resulting from tumbling, would have only a minute effect. Since the present invention is directed to an appreciable, recognizable effect it is anticipated that chamfers substantially in excess of the minute chamfers, referred to previously, will be used. Thus in order to obtain practical results the wall thickness of end portions 46 and 46' should be selected to increase from a thickness no greater than approximately 93 percent of the thickness of the intermediate portion 48 at each of the ends to 100 percent of the thickness of the intermediate portion 48 at points located axially toward the center of the collar 14 a distance at least approximately equal to 35 percent of the wall thickness of the intermediate portion 48. In considering the above dimensions with the dimensions of the collar 14 as exemplified by the drawings the wall thickness of end portions 46 and 46' can be considered to increase from a thickness in the range of approximately 93 percent to about zero percent of the thickness of the intermediate portion 48 at each of the ends to 100 percent of the thickness of the intermediate portion 48 at points located axially toward the center of the collar 14 a distance in the range of from approximately, at least 35 percent to 75 percent of the wall thickness of the intermediate portion 48.

Although the invention has been described with respect to a preferred embodiment thereof, it is to be understood that it is not to be so limited, since changes can be made therein which are within the scope of the invention as defined by the appended claims.

What is claimed is:

1. A two-part fastener comprising: a pin and a symmetrical collar, said pin and said collar having lock means for locking said pin and said collar together as said collar is swaged radially inwardly into said pin, said pin having a pull portion for adapting the pin for gripping and pulling, said collar being substantially tubular with a substantially uniform external diameter from end to end and having symmetrical end portions of increasing wall thickness from the ends toward the center and an intermediate portion between said end portions of a substantially uniform wall thickness, said wall thickness of each of said end portions increasing from a thickness less than approximately 93 percent of said uniform wall thickness at each of said ends to 100 percent of said uniform wall thickness at points located axially toward said center from the respective ones of said ends a distance at least approximately 35 percent of said uniform wall thickness.

2. A two-part fastener comprising: a pin and a symmetrical collar, said pin and said collar having lock means for locking said pin and said collar together as said collar is swaged radially inwardly into said pin, said pin having a pull portion for adapting the pin for gripping and pulling, said collar being substantially tubular with a substantially uniform external diameter from end to end and having symmetrical end portions of increasing wall thickness from the ends toward the center and an intermediate portion between said end portions of a substantially uniform wall thickness, said wall thickness of each of said end portions increasing from a thickness in the range of approximately 93 percent to about 0 percent of said uniform wall thickness at each said ends to 100 percent of said uniform wall thickness at points located axially toward said center from the respective ones of said ends a distance in the range of from approximately 35 percent to about 75 percent of said uniform wall thickness.

3. A two-part fastener comprising: a pin and a symmetrical collar, said pin and said collar having lock means for locking said pin and said collar together as said collar is swaged radially inwardly into said pin, said pin having a pull portion for adapting the pin for gripping and pulling, said collar being substantially tubular with a substantially uniform external diameter from end to end and having a substantially uniform internal diameter terminating at both ends with similar chamfers so as to provide a symmetrical and reversible collar, each of said chamfers of said end portions increasing from a thickness less than approximately 93 percent of said uniform wall thickness at each of said ends to 100 percent of said uniform wall thickness at points located axially toward said center from the respective ones of said ends a distance at least approximately 35 percent of said uniform wall thickness.

4. A two-part fastener adapted to be set by a tool for applying a relative axial force between the two parts and having an anvil member with a flared radially inner swaging surface for swaging one part onto the other comprising: a pin and a symmetrical collar, said pin and said collar having lock means for locking said pin and said collar together as said collar is swaged radially inwardly onto said pin, said pin having a pull portion for adapting the pin for gripping and pulling by the tool, said collar being substantially tubular and having symmetrical end portions of increasing wall thickness from the ends toward the center and an intermediate portion between said end portions of a substantially uniform wall thickness, said collar being engageable with the anvil and being swaged onto said pin as a relative axial force of a preselected magnitude is applied by the tool between said pin and said collar and as the flared surface of the anvil is moved over said collar, said wall thickness of each of said end portions increasing from a thickness less than approximately 93 percent of said uniform wall thickness at each of said ends to about 100 percent of said uniform wall thickness at points located axially toward said center from the respective ones of said ends a distance at least approximately equal to 35 percent of said uniform wall thickness, one of said end portions being initially engageable with the flared surface of the anvil with said increasing wall thickness being selected to permit radial inner deformation of said one of said end portions to a point radially spaced from said pin and to hold off the flared surface of the anvil from swaging said intermediate portion onto said pin until the axial force applied by the tool reaches said preselected magnitude.

References Cited by the Examiner

UNITED STATES PATENTS 2,396,661 3/46 Keller et al. _____ 85—37
2,531,049 11/50 Huck _____ 85—37

EDWARD C. ALLEN, *Primary Examiner.*

UNITED STATES PATENT OFFICE
CERTIFICATE OF CORRECTION

Patent No. 3,215,024            November 2, 1965

Harold G. Brilmyer et al.

It is hereby certified that error appears in the above numbered patent requiring correction and that the said Letters Patent should read as corrected below.

Column 1, after line 12, insert the following paragraph:
This invention relates generally to fastening devices and more particularly to an improved fastening device of the type disclosed in the Huck U. S. Patents Nos. 2,531,048 and 2,531,049.

column 2, line 15, for "beyound" read -- beyond --; line 44, after "gripping" insert -- stem --; column 4, line 25, for "not" read -- no --.

Signed and sealed this 6th day of September 1966.

(SEAL)
Attest:

ERNEST W. SWIDER
Attesting Officer

EDWARD J. BRENNER
Commissioner of Patents